United States Patent [19]
Storck et al.

[11] 3,879,335
[45] Apr. 22, 1975

[54] PRODUCTION OF PIGMENTED RESIN POWDERS

[75] Inventors: Gerhard Storck, Ruchheim; Horst Diefenbach, Ludwigshafen; Matthias Marx, Duerkheim; Otto Nagel, Neustadt; Heribert Kuerten; Werner Weinle, both of Mannheim, all of Germany

[73] Assignee: Badische Anilin- & Soda-Fabrik Aktiengesellschaft, Ludwigshafen/ Rhine, Germany

[22] Filed: Aug. 14, 1972

[21] Appl. No.: 280,262

[30] Foreign Application Priority Data
Aug. 14, 1971   Germany.......................... 2140843

[52] U.S. Cl............... 260/37 EP; 106/241; 117/17; 117/21; 117/DIG. 6; 260/34.2; 260/37 N; 260/37 AL; 260/38; 260/39 R; 260/40 R; 260/42.54; 260/42.55
[51] Int. Cl....................... C08f 45/06; C08g 51/04
[58] Field of Search....... 260/34.2, 41, 37 EP, 37 N, 260/37 AL, 38, 39 R, 40 R, 42.54, 42.55; 106/241

[56] References Cited
UNITED STATES PATENTS

| | | | |
|---|---|---|---|
| 2,379,237 | 6/1945 | Jenkins................. | 260/41 |
| 3,449,291 | 6/1969 | Lerman et al. ......... | 260/41 |
| 3,637,571 | 1/1972 | Polovina............... | 260/34.2 |
| 3,737,401 | 6/1973 | Tsou et al............. | 260/34.2 |

Primary Examiner—James H. Derrington
Attorney, Agent, or Firm—Johnston, Keil, Thompson & Shurtleff

[57] ABSTRACT

Production of pigmented resin powders by finely dispersing dispersions of pigments in solutions of polymeric materials in at least one organic solvent in water containing a protective colloid while supplying mixing energy, and removing the solvent. A preferred method is to introduce one or more jets of water containing protective colloid at the rate of 5 to 100 m/sec into an impulse exchange chamber together with the dispersion issuing in the immediate vicinity of the orifice(s), and to remove the solvent. The method avoids cross-linking and provides pigmented resin powders of consistently reproducible color which are suitable for conventional powdered-resin coating methods.

1 Claim, 1 Drawing Figure

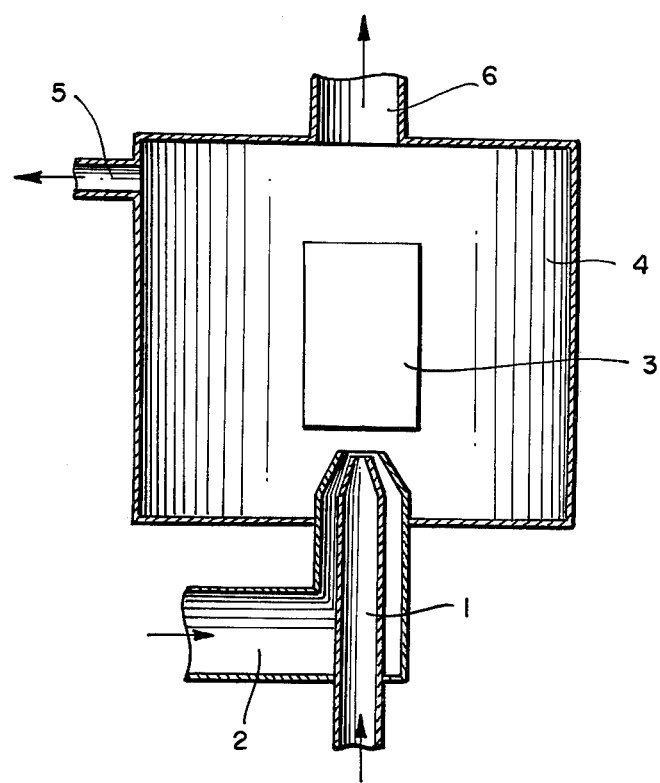

PRODUCTION OF PIGMENTED RESIN POWDERS

This invention relates to a method of producing pigmented resin powders such as are used to make coatings by electrostatic powder coating, fluidized-bed coating, flame-spray coating, or electroless techniques.

Powdered-resin coating has the advantage over other conventional coating methods of providing satisfactory coatings without the use of solvents, thus substantially reducing the risk of fire during application. Moreover, practically no injurious substances are released to the atmosphere. Existing methods for the manufacture of pigmented resin powders are however highly troublesome and difficult to reproduce.

The most important method for the manufacture of resin powders is melt homogenization which involves mixing of suitable binders with pigments, fillers, optionally catalysts, flow improvers and other auxiliaries followed by melt homogenization in screw kneaders, roller mills or other mixing equipment. The homogeneous melt is cooled and granulated in cutting or similar mills. The granular material is then size reduced in jet mills, the desired fraction being obtained by sieving. As a rule, the fraction below 90 $\mu$m is used for electrostatic powder coating.

Resin powders thus obtained can be applied to clean and conductive substrates, preferably of metal, with commercially available equipment such as electrostatic sprayguns, and the coating baked, the baking conditions depending mainly on the type of binder used and the extent of catalytic action and varying from 15 to 30 minutes at 130° to 220°C. The resistance of the film to weathering, chemicals and mechanical stress depends mainly on the type of binder and pigment and the thickness of the film.

The said process has a number of disadvantages.

When using reactive binders, undesirable crosslinking reactions may take place during melt homogenization which is usually carried out at temperatures of from 90° to 110°. The risk of crosslinking is the greater the more reactive the binder or the stronger the catalytic effect. This premature crosslinking may proceed to a point where the powder is no longer melted during baking, i.e. is unusable. Moreover, in the event of partial crosslinking there is the risk of the pigment and auxiliaries not being uniformly distributed, so that surface irregularities may occur which are usually undesirable.

Another disadvantage of the process is the difficulty of reproducing any particular shade or modifying the same. Corrections, for example, can only be made by mixing the resin powder with the additional pigment and repeating the entire manufacturing process, which again involves the risk of premature crosslinking in the kneader.

Yet another unpleasant feature of the process is that slight premature crosslinking and shade continuity can only be determined on the ready-made powder, i.e. not until the entire process has been completed.

It is an object of the present invention to provide a process for the manufacture of pigmented resin powders in which the risk of premature crosslinking is substantially eliminated and which ensures much better continuity of shade.

This object is achieved by a process for the manufacture of pigmented resin powders in which dispersions containing polymeric substances dissolved in an organic solvent or mixture of solvents, pigments dispersed in said solution and if desired other conventional additives, are finely dispersed with the supply of mixing energy in water containing at least one water-soluble protective colloid, and the organic solvent or mixture of solvents is removed.

In a preferred embodiment of the process of the invention, as shown in the accompanying drawing water containing a protective colloid is introduced at the rate of 5 to 100 m/sec through one or more nozzles into an impulse exchange chamber located in the water containing protective colloid and extending in the direction of entry of the jets of water together with the dispersion issuing in the immediate vicinity of the orifice(s), said dispersion containing polymeric substances dissolved in an organic solvent or mixture of solvents, pigments, dispersed in said solution and if desired other conventional additives, the mean hydraulic diameter of the impulse exchange chamber being from 2 to 20 times the diameter of the inner nozzle orifice, and its length being from 2 to 30 times its hydraulic diameter.

The process yields a suspension of pigmented resin powder in the water containing protective colloid and used as precipitant. The latter is removed by conventional methods, e.g. centrifugation or filtration, and the dispersion dried at a temperature below the melting range of the polymeric material, expediently from 10° to 80°C, and preferably from 20° to 60°C, if desired under reduced pressure. The resultant powder can, either directly or after grinding and sieving, be used as a bonding agent or to make films, shaped articles and particularly coatings by electrostatic powder coating, fluidized-bed coating and other conventional methods.

Pigmented resin powders obtained by the process of the invention are substantially free from crosslinking and their shade is consistently reproducible.

Suitable solvents for the polymers or mixtures of polymers are conventional organic solvents and solvent mixtures which dissolve the polymers or polymer mixtures and can be removed from the precipitating liquor.

Examples are organic solvents having a boiling range of from 50° to 160°C, preferably from 55° to 95°C, at atmospheric pressure such as aliphatic, hydroaromatic and/or aromatic hydrocarbons, e.g. hexane, heptane, cyclohexane, benzene, toluene, xylene, esters of lower carboxylic acids with alcohols of from 1 to 5 carbon atoms, e.g. methyl acetate, ethyl acetate, isopropyl acetate, isobutyl acetate, ketones such as acetone, methyl ethyl ketone, ethers of monohydric and polyhydric alcohols such as diethyl ether, diisopropyl ether, tetrahydrofuran, dioxane, aliphatic and/or hydroaromatic alcohols, e.g. methanol, ethanol, isopropanol and cyclohexanol and mixtures thereof. Aromatic hydrocarbons such as benzene and esters of lower carboxylic acids such as methyl acetate and ethyl acetate are preferred.

Suitable polymeric substances are conventional synthetic resins or mixtures of the same or with natural resins provided they are soluble in organic solvents. Examples are copolymers containing units of esters of $\alpha,\beta$-olefinically unsaturated carboxylic acids of 3 to 5 carbon atoms, e.g. acrylic or methacrylic acid, with a $C_1$ to $C_8$ alcohol, e.g. methyl, ethyl, isopropyl, n-butyl, isobutyl, t-butyl and 2-ethylhexyl acrylate or methacrylate, and other copolymerizable olefinically unsaturated compounds such as styrene, vinyltoluene, $\alpha$-methylstyrene, chlorostyrene, acrylonitrile, methacrylonitrile, acrylamide, methacrylamide, vinyl esters of $C_2$ to $C_6$ carboxylic acids, e.g. vinyl acetate, vinyl propionate, vinyl pivalate, vinyl ethers such as vinyl isopropyl ether, hydroxyl-containing copolymerizable olefinically unsaturated compounds, e.g. allyl alcohol and methallyl alcohol, monoacrylates and monomethacrylates of polyhydric alcohols, e.g. glycol monoacrylate, butanediol-1,4-monoacrylate, hydroxy-propyl acrylate, butanediol-1,4-monomethacrylate, vinyl tioethanol and vinyl glycol, and other copolymerizable olefinically unsaturated monomeric compounds containing reactive groups, e.g. N-methylolacrylamide, N-methylolmethacrylamide, and their N-alkoxy ethers with $C_1$ to $C_8$ alcohols and glycidyl acrylate or methacrylate. Such polymers are obtained by conventional methods such as bulk, solution, suspension or emulsion polymerization, thioethanol Saturated and/or unsaturated polyesters containing units of, for example, terephthalic acid or ethylene glycol are also suitable as polymeric substances for the process of the invention.

Other resins which are suitable for the present process are epoxy resins, polyurethanes, amino resins such as urea or melamine formaldehyde resins and phenoplast resins and their mixtures with each other or with the said copolymers.

Acrylate, epoxy and polyester resins are preferred. The polymeric substances are generally dissolved in the organic solvent or mixture of solvents in an amount of from 10 to 90, preferably 30 to 60, percent w/w depending on the degree of polymerization.

Suitable pigments which are dispersed in the solutions of polymeric substances used for the process of the invention are those conventionally used in the surface coatings industry, e.g. titanium dioxide.

Other conventional additives that may be contained in the dispersion are fillers such as kaolin, flow improvers such as silicones, and curing agents such as dicyandiamide.

It is an advantage of the process that the addition of the auxiliaries and the dispersion of the pigments can be carried out by methods conventionally used in the surface coatings industry, for example in ball or attrition mills.

In the process of the invention the dispersion is finely dispersed, with the supply of mixing energy, in water containing at least one water-soluble protective colloid, and the solvent or solvent mixture is removed.

Suitable water-soluble protective colloids are particularly high molecular weight water-soluble materials such as partially saponified polyvinyl acetate or vinyl acetate copolymers, polyvinyl alcohols, polyvinylpyrrolidone, vinylpyrrolidone copolymers, water-soluble polyvinyl ethers, polyethylene oxide, polypropylene oxide, and adducts of ethylene oxide and propylene oxide.

The water-soluble protective colloid is contained in the water used as precipitant (which may additionally contain water-miscible organic solvents such as lower alcohols or ketones in minor amounts, i.e. less than 20 percent w/w) in an amount of 0.01 to 5 percent w/w, preferably 0.05 to 2 percent w/w.

For the purposes of the invention the dispersion may be added to the water containing protective colloid for example by dripping or spraying it into the water which is being subjected to intense shearing forces, the temperature of the water being such that the solvent or solvent mixture can be distilled. This method is convenient for example when using solutions in ethyl acetate if the ratio of dispersion to water containing protective colloid is chosen so that the solubility limit of ethyl acetate in water is maintained. It is important that the dispersion should be fed into the water containing protective colloid at a point where the shearing action is particularly intense, for example near the impeller, so that rapid and complete precipitation of the dispersion occurs. The particle size obtained can be regulated for example by means of the stirring rate.

The process provides a pigmented resin powder that is dispersed in the precipitant. The powder can be separated by conventional methods such as filtration, centrifugation, sedimentation or other methods, washed with water or other liquids and then dried in conventional manner.

Alternatively, the solvent or solvent mixture may dissolve in the water containing protective colloid after the dispersion has been added to the same. In this case, the dispersed pigmented powder can be isolated from the solvent/water mixture by filtration, centrifugation, sedimentation or other methods. The solvent/water mixture can then be worked up by conventional methods, e.g. distillation.

The powder can be brought to the desired particle size by grinding and subsequent sieving. It is a special advantage of the process of the invention that grinding can often be dispensed with because the required particle size can be adjusted within a wide range.

The powder may be applied by electrostatic powder coating, fluidized-bed coating, flame-spray coating or electroless methods. Baking conditions depend on chemical composition and reactivity of the binder.

As compared with coatings produced with conventional resin powders, coatings obtained with powders of the invention have considerable advantages regarding continuity of shade, and superior flow and mechanical properties are obtained due to the outstanding homogeneity of the coatings.

Another substantial advance offered by the process is that pigmented resin powders of much higher reactivity can be produced than by the extruder method, so that baking temperatures can be reduced.

Another useful and cost-saving feature is that the solvent can be recovered and grinding and sieving can often be dispensed with.

Obviously, the new process may also be used to produce unpigmented powders, and the same benefits, e.g. higher reactivity, are obtained as in the case of pigmented systems.

The invention is further illustrated in the following Example.

EXAMPLE a. Manufacture of the Basic Resin Solution 85 g of titanium dioxide (Rutile) is dispersed for 2½ hours with an impeller in 1,000 parts of a 35 percent solution of a copolymer prepared from 157.7 parts of styrene, 17.5 parts of methyl methacrylate, 70 parts of ethylhexyl acrylate, 87.5 parts of butoxymethyl methacrylamide and 17.5 parts of acrylic acid in ethyl acetate.

b. Manufacture of the Resin Powder.

$b_1$. 200 parts of the dispersion prepared as described under (a) are incorporated at 90°C at 4 atm. gauge in the course of 2 hours by means of a spraygun into an intensely stirred solution of 2 parts of polyvinyl alcohol in 2,000 parts of water, the ethyl acetate being distilled through a descending condenser. When all has been added, stirring is continued at 90°C for about 2 hours until all of the ethyl acetate has been removed. The mixture is cooled, the precipitated plastics particles are isolated by centrifugation, washed three times, each time with 200 parts of water, and dried. Oversize material is removed by sieving through a 90 μm sieve. The resultant powder can immediately be used for electrostatic powder coating.

$b_2$. Manufacture of the powder in apparatus as shown in the accompanying drawing.

The precipitant consisting of 30 parts of polyvinyl alcohol in 1,000 parts of water is heated to 85°C and injected through the inner portion of a two-fluid nozzle 1 whose diameter is 2 mm at a pressure of 1 atm. gauge into mixing tank 4 filled with precipitant in such a way that the jet passes concentrically through impulse exchange tube 3 having an internal diameter of 20 mm and a length of 150 mm.

At the same time the polymer dispersion is introduced into the precipitant in the course of 1 minute through the outer jacket of the nozzle which tapers to a width of 1 mm at the orifice. The ethyl acetate solvent is distilled at 6. The resultant dispersion of the plastics particles in the precipitant leaves at 5 and is centrifuged. The plastics particles are washed three times, each time with 200 parts of water, and then dried. Their particle size is from 5 to 80 μ and they can be used for electrostatic powder coating without previous grinding or sieving.

c. Comparative experiment (conventional resin powder manufacture)

350 parts of solid binder of the above composition is mixed with 85 parts of titanium dioxide (Rutile) and homogenized in a kneader, e.g. a ko-kneader, at 90°C with a residence time of 180 seconds. The cold melt is ground coarse and then fine and the fraction below 90 μ recovered by sieving.

The powders obtained according to (b) and (c) are applied to deep-drawn steel sheet by electrostatic powder coating techniques and the film baked for 25 minutes at 180°C.

Coatings obtained with powders ($b_1$) and ($b_2$) show good flow, good gloss and very satisfactory mechanical properties. Powder (c) could not be melted. It had obviously undergone crosslinking in the thermal treatment in the kneader.

The process of the invention thus gives powders having superior reactivity to conventional systems.

We claim:

1. A process for the manufacture of pigmented resin powders which comprises:
    1. mixing (a) a dispersion of a pigment in a polymeric substance dissolved in a solvent, and (b) water containing from 0.01 to 5.0 percent w/w of a water-soluble protective colloid by introducing at least one jet of water containing said protective colloid at the rate of 5 to 100 m/sec through the inner orifice of one or more nozzles having an inner and an outer concentric nozzle orifice into an impulse exchange chamber located in a mixing tank, both said chamber and said tank being filled with water containing said protective colloid and extending in the direction of entry of the jet of water together with said dispersion which is introduced into said impulse exchange chamber through said outer concentric nozzle orifice, the mean hydraulic diameter of said impulse exchange chamber being from 2 to 20 times the diameter of the inner nozzle orifice, and its length being from 2 to 30 times its hydraulic diameter, whereby said polymeric substance containing said pigment is precipitated from said solvent in the form of particles; and
    2. removing said solvent and said water from said particles whereby a pigmented resin powder is formed.

* * * * *